United States Patent [19]

Klausing et al.

[11] Patent Number: 4,891,955
[45] Date of Patent: Jan. 9, 1990

[54] ENGINE SUSPENSION SYSTEM

[75] Inventors: Thomas A. Klausing, Columbus; Larry Schluer, Sugar Grove, both of Ohio

[73] Assignee: Gas Research Institute, Chicago, Ill.

[21] Appl. No.: 322,898

[22] Filed: Mar. 14, 1989

[51] Int. Cl.⁴ .............................................. F25D 19/00
[52] U.S. Cl. ........................................ 62/295; 62/296; 62/297; 417/363
[58] Field of Search ................. 62/239, 295, 296, 297, 62/323.1; 417/363

[56] References Cited

U.S. PATENT DOCUMENTS

| | | | |
|---|---|---|---|
| 2,483,007 | 9/1949 | Higham | 62/295 X |
| 3,785,167 | 1/1974 | Sahs | 417/363 X |
| 3,918,850 | 11/1975 | Bridigum | 62/295 X |

Primary Examiner—Lloyd L. King
Attorney, Agent, or Firm—Watkins, Dunbar & Pollick

[57] ABSTRACT

A heat pump system comprised of an internal combustion engine and a rigidly connected refrigeration compressor is provided with a vibration isolation support having compression springs which have spring rates and natural vibration frequencies that are substantially less than the lowest operating frequency of the internal combustion engine/refrigeration compressor combination.

6 Claims, 1 Drawing Sheet

4,891,955

ENGINE SUSPENSION SYSTEM

TECHNICAL FIELD

This invention relates generally to internal combustion engines, and particularly concerns an engine suspension system capable of reducing engine noise, minimizing engine vibration, and prolonging engine operating life.

BACKGROUND OF THE INVENTION

Heretofore, conventional heat pump equipment marketed in the United States has typically utilized electric motors as the source of motive power to drive the compressor elements that are incorporated into included reversible refrigeration cycle schemes. Recently, efforts to use gaseous fuel, such as natural gas, in heat pump applications has resulted in adaption of single cylinder, internal combustion engines fueled by natural gas as the source of motive power. By use of a novel engine suspension system in the natural gas-fueled, single cylinder, internal combustion engine heat pump application we have been able to provide system performance regarding noise, vibration, and durability which is equal to the performance of heat pump systems having electric motors as the motive power source.

The use of compression springs in suspension systems has heretofore been known. U.S. Pat. No. 943,709 to Sherwood teaches the use of vibration reduction through the use of compression springs in a typewriter support arrangement. U.S. Pat. No. No. 1,066,209 to Ljungstrom teaches the use of such springs in a turbine-generator system not involving internal combustion apparatus.

U.S. Pat. No. 2,883,130 to Rose likewise teaches the use of compression springs but does not provide for free-float of the supported machine prior to initiating snubbing action by included round solid pieces of a compressible material such as rubber. U.S. Pat. No. 2,923,505 to Immendorf provides compression spring support to a record player but does not provide for free-float and limited snubbing of the record carrying member during system operation.

Lastly, U.S. Pat. No. 3,198,506 to Thorn also teaches the use of vibration-absorbing compression spring means in a mounting but does not specify adaptation of the mounting to a heat pump system single cylinder, internal combustion engine. Additionally, Thorn does not provide for free-float prior to snubbing in mounting vertical and horizontal directions.

Such prior art vibration absorbtion schemes do not provide or suggest the engine suspension system of the present invention and the noise reduction, vibration reduction, and improved operating life advantages that are obtained by applicants.

SUMMARY OF THE INVENTION

In order to achieve the advantages associated with the present invention we provide a heat pump system that has a natural gas-fueled, single cylinder, internal combustion engine driving a coupled refrigeration compressor. The compressor is rigidly mounted to the engine by means of a transition casting housing the engine/compressor coupling. The engine/compressor assembly is supported by properly located compression springs. The compression springs must necessarily each have a spring rate such that the resulting natural frequency in all vibration modes is substantially lower than the lowest operating frequency of the internal combustion engine. Additionally, the spring suspension system incorporates a snubber feature which permits free-float of the engine/compressor combination in both limited vertical and lateral directions prior to initiating snubbing action.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope or sacrificing any of the advantages of the invention which is delineated in the included claims.

A PREFERRED EMBODIMENT OF THE BEST MODE OF CARRYING OUT THE INVENTION

Figure 1:
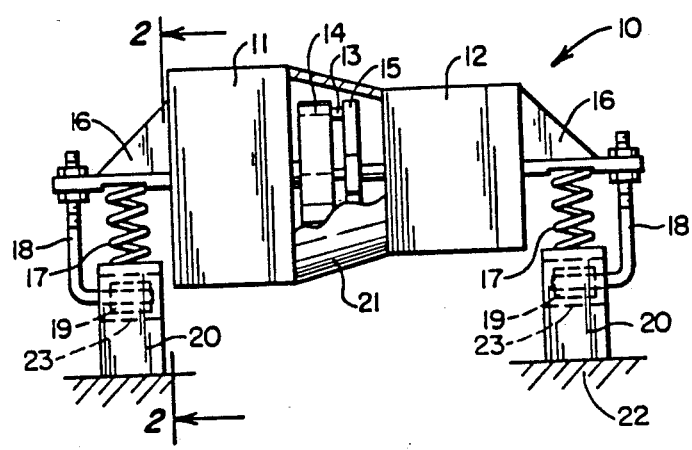
FIG. 1 is a schematic side elevational view of a preferred embodiment of the heat pump internal combustion engine-compressor combination and included novel compression spring suspension system.
Figure 2:
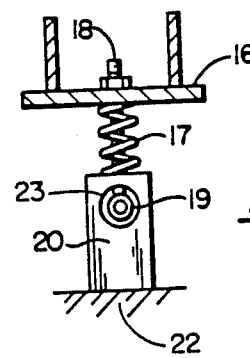
FIG. 2 is a sectional view taken at line 2—2 of FIG. 1 showing details of the suspension system snubber.

A preferred embodiment of our invention is illustrated schematically in FIG. 1 of the drawings and is generally designated by the reference numeral 10. Such invention embodiment includes a single-cylinder internal combustion engine 11 that drives a refrigeration compressor 12 through the coupling designated 13. The coupling 13 is typically comprised of an engine flywheel 14, a compressor spider 15, and slidable pin connections resiliently installed between flywheel 14 and spider 15. Engine 11 and compressor 12 are preferably connected to each other by a rigid transition casting means 21 that essentially surrounds coupling 13 and constitutes a connecting frame unit.

Brackets 16, which are integrally cast with the housings of engine 11 and compressor 12 are supported by a plurality of resilient compression springs means 17 of which only two are illustrated in FIG. 1. Springs 17 are preferably located on a generally horizontal plane (plan view) so that they are equally loaded by the weight of the engine-compressor-base combination. In one actual embodiment of our invention only four compression springs 17 were utilized and such were symmetrically located about the center of gravity of the apparatus structure. In order to obtain the advantages associated with our invention, it is important that each compression spring 17 have a spring rate and a natural frequency under load which is substantially less than the operating frequency of the engine-compressor combination. For instance, in one actual application of our invention, an internal combustion engine, fueled by natural gas and driving a refrigeration compressor nominally rated at 3 tons of refrigeration, operated with a nominal operating frequency of 1,200 r.p.m. and had four compression springs suitably positioned and selected to provide a natural vibration frequency of 4 Hz in all vibration modes.

FIG. 1 also schematically illustrates a preferred form of snubber means or device for apparatus 10. Such snubber arrangement is comprised of a snubber 18, one for each spring, and adjustably and threadably secured and depending from mounting brackets 16 of the frame unit, a resilient bushing 19 mounted on a lateral arm of the snubber, and a cooperating mounting means 20 which is attached to a substrate 22. Each mounting 20 supports a compression spring 17 and additionally has a walled recess 23 within which resilient bushing 19 interfaces cooperates. When the suspension system is properly adjusted, each bushing 19 is substantially centered within the mounting recess 23 and is surrounded by a limited amount of unoccupied space so that components 11 and 12 and the snubbers 18, can "free-float" to a limited extent during heat pump system operation. When eccentricities are induced in the power cycle, such as during starts and stops, vibrations are snubbed by damping contact with the walls of the recess 23.

Through utilization of the herein-described engine suspension system we are able to provide heat pump equipment with an internal combustion engine motive power source (fueled by natural gas) that performs as noiselessly, as free of vibration, and with as long an operating life as a heat pump system powered by a conventional electric motor. The success of the invention is in large part attributed to a substantial decoupling of the engine/compressor components, through the suspension system, from the remainder of the heat pump system such as the foundation, housing, connected evaporator/condenser, and like system components.

Decoupling occurs because of low natural frequency of the disclosed compression spring suspension system during normal operating modes. Snubbing action only occurs during starting and stopping transients.

It is herein understood that although the present invention has been specifically disclosed with the preferred embodiments and examples, modifications and variations of the concepts herein disclosed may be resorted to by those skilled in the art. Such modifications and variations are considered to be within the scope of the invention and the appended claims.

We claim:

1. A heat pump system comprising:
   (a) an internal combustion engine motive power source;
   (b) a refrigeration compressor coupled to said internal combustion engine;
   (c) rigid means interconnecting said internal combustion engine and coupled refrigeration compressor as a unit; and
   (d) a plurality of compression spring means supporting said internal combustion engine and connected refrigeration compressor,
   each said compression spring having a spring rate and a natural frequency under load which is substantially less than the lowest operating frequency of said internal combustion engine and connected refrigeration compressor.

2. The heat pump system defined by claim 1 and further comprising a plurality of snubber means secured to said internal combustion engine/refrigeration compressor combination, each said snubber means having limited free-float in vertical and lateral directions when said internal combustion engine refrigeration compressor combination statically loads said plurality of compression spring means.

3. The heat pump system defined by claim 2 and further comprising a plurality of resilient bushing means as a part of said plurality of snubber means.

4. In a heat pump system having a refrigeration compressor driven by a gaseous fuel powered internal combustion engine mutually carried in a frame as a unit; with the frame unit resiliently supported on a substrate, the improvement wherein the support comprises;
   (a) mounting means positioned on the said substrate;
   (b) resilient spring means in supporting connection between the frame unit and said mounting means;
   (c) and snubber means connected to the frame and constructed to free-float within a walled recess in the mounting means on response to vibrations of the frame induced by eccentricities in the power cycle of the internal combustion engine, whereby said vibrations are snubbed by dampening contact of the snubber means with the walls of the recess in the mounting means.

5. A system according to claim 4 wherein the snubber means is constructed with a resilient surface interfacing with the wall of the recess in the mounting means.

6. A system according to claim 5 wherein:
   (a) the mounting means is constructed as an upstanding mount member connected to the substrate at the lower end, with the spring means at the opposite end, and is provided with a generally cylindrical recess between said ends, and
   (b) the snubber means includes a depending arm connected to the frame at the upper end and formed with a projecting lateral portion positioned generally on the central axis of the cylindrical recess, the lateral portion of the arm having a resilient bushing on the external surface thereof to interface with the surface of the recess when eccentric vibrations occur and to free-float between the occurrence of said eccentric vibrations.

* * * * *